United States Patent [19]

Chatterjea et al.

[11] Patent Number: 4,779,416

[45] Date of Patent: Oct. 25, 1988

[54] CONTROL SYSTEM FOR FRONT END LOADER BOOM AND BUCKET OPERATING SYSTEMS

[75] Inventors: Probir K. Chatterjea, Mt. Prospect; Steven C. Kirkham, McHenry, both of Ill.

[73] Assignee: Dresser Industries, Inc., Dallas, Tex.

[21] Appl. No.: 72,770

[22] Filed: Jul. 13, 1987

[51] Int. Cl.[4] ........................ F16D 31/02; F15B 13/02

[52] U.S. Cl. ........................................ 60/429; 60/468; 60/484; 60/486; 91/461

[58] Field of Search ................. 60/428, 429, 430, 486, 60/468, 484; 91/461; 417/286, 287

[56] References Cited

U.S. PATENT DOCUMENTS 3,952,510 4/1976 Peterson .......................... 60/429 X 4,113,054 9/1978 Myers .............................. 60/486 X 4,141,280 2/1979 Lorimar ........................... 60/428 X 4,509,406 4/1985 Melocik ........................... 91/461 X

*Primary Examiner*—Edward K. Look

*Attorney, Agent, or Firm*—Roy L. Van Winkle

[57] ABSTRACT

A control system for the boom and bucket operation system on a front end loader that includes an unloader valve responsive to pilot valve pressure to bypass hydraulic fluid pumped by an auxiliary pump to the reservoir while maintaining the primary pump supply to a loader valve which supplies pressure to the boom and bucket cylinders in response to the operation of pilot valves. The unloader valve bypasses the auxiliary pump flow when the pressure is below a predetermined value and when the pressure is above a second higher predetermined value.

6 Claims, 4 Drawing Sheets

CONTROL SYSTEM FOR FRONT END LOADER BOOM AND BUCKET OPERATING SYSTEMS

BACKGROUND OF THE INVENTION

This invention relates generally to heavy duty equipment such as earth moving equipment. More particularly, but not by way of limitation, this invention relates to an improved control system for a front end loader boom and bucket operating system.

In the operation of heavy duty earth moving equipment, such as front end loaders, it is highly desirable: 1. to provide the power when required to the boom and/or the bucket; 2. to control the positions of the boom and the bucket with as little lag time as possible and as precisely as possible; and 3. to provide as much tractive or propulsive power to the vehicle as possible.

As an example of the foregoing, and when used with front end loaders, it is, of course, highly desirable to be able to provide maximum tractive effort when the bucket is forced into the pile, maximum power to the bucket when the bucket is filling and to the boom when lifting through the pile, to provide maximum finesse to the operator when it is desired to place the load in a particular position such as when either stacking the earth or in the process of loading vehicles. It is the object of this invention to provide apparatus which will provide each of the foregoing advantages.

SUMMARY OF THE INVENTION

This invention provides a control system for a front end loader boom and bucket operating system that includes primary and auxiliary hydraulic pumps and that comprises: a fluid reservoir that is arranged to be connected to the pumps; a pilot pump that is connected to the reservoir for providing pressurized hydraulic fluid to the control system; at least one pilot valve connected to the pilot pump; and unloader valve means that is connected to the pilot valve reservoir and that is responsive to a pressure signal of first or second predetermined values for directing fluid from the auxiliary pump to the reservoir when the signal is below a first predetermined value and when the signal is above a second predetermined value, thereby providing additional tractive power to the loader.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein.

DETAILED DESCRIPTION OF THE PREFERRED EMBODIMENT

Figure 1:
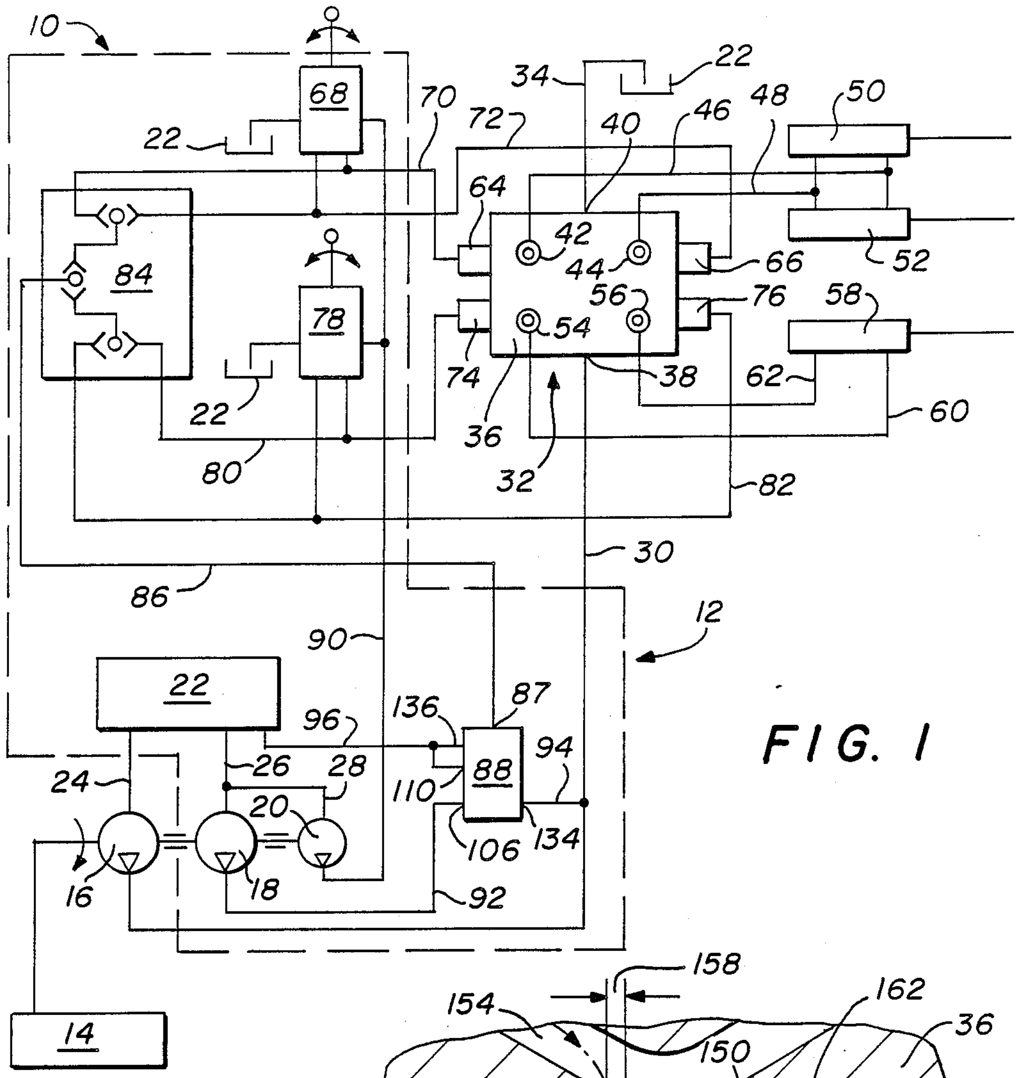
FIG. 1 is a schematic view illustrating a control system for a front end loader that is constructed in accordance with the invention.

Referring to the drawing and to FIG. 1 in particular, shown therein and generally designated by the reference character 10 is an operating system for a boom and bucket on a front end loader that is constructed in accordance with the invention. The operating system 10 includes a control system that is generally indicated by the phantom line 12.

The operating system 10 includes an engine 14 which drives a primary pump 16, an auxiliary pump 18, and a pilot pump 20. The pumps 16, 18 and 20 are connected to a reservoir 22 by conduits 24, 26 and 28, respectively.

The primary pump 16 is also connected by a conduit 30 with loader valve means 32. The loader valve means 32 is connected by a conduit 34 with the reservoir 22. The loader valve means 32 is a purchased item that has been modified, as will =discussed more fully in connection with FIG. 3. The loader valve means 32 includes a housing 36 having an inlet 38 that is connected to the conduit 30, a return outlet 40 connected to the conduit 34.

Boom outlets 42 and 44 are connected by conduits 46 and 48 with boom control cylinders 50 and 52, respectively. The housing 36 also includes bucket control outlets 54 and 56 connected to a bucket control cylinder 58 by conduits 60 and 62, respectively.

The loader valve means 32 is a pilot actuated valve and the housing 36 includes pilot ports 64 and 66 that are connected to a boom pilot control valve 68 by conduits 70 and 72, respectively. Similarly, the housing 36 includes bucket control pilot ports 74 and 76 that are connected to a bucket pilot control valve 78 by conduits 80 and 82, respectively.

The conduits 70, 72, 80 and 82 also extend to a pressure sensing means 84 which may be described as a double shuttle valve. The sensing means 84 is used to determined the highest pressure in any of the conduits connected thereto. The sensing means 84 is connected by conduit 86 to a pilot port 87 of an unloading valve means 88.

Pilot control valves 68 and 78 are connected to the reservoir 22 for the return of fluid flowing in the control system 12. The pilot pump 20 is connected by conduit 90 with each of the pilot control valves 68 and 78 for the purpose of supplying pressurized hydraulic fluid to the control system 12.

Figure 2:
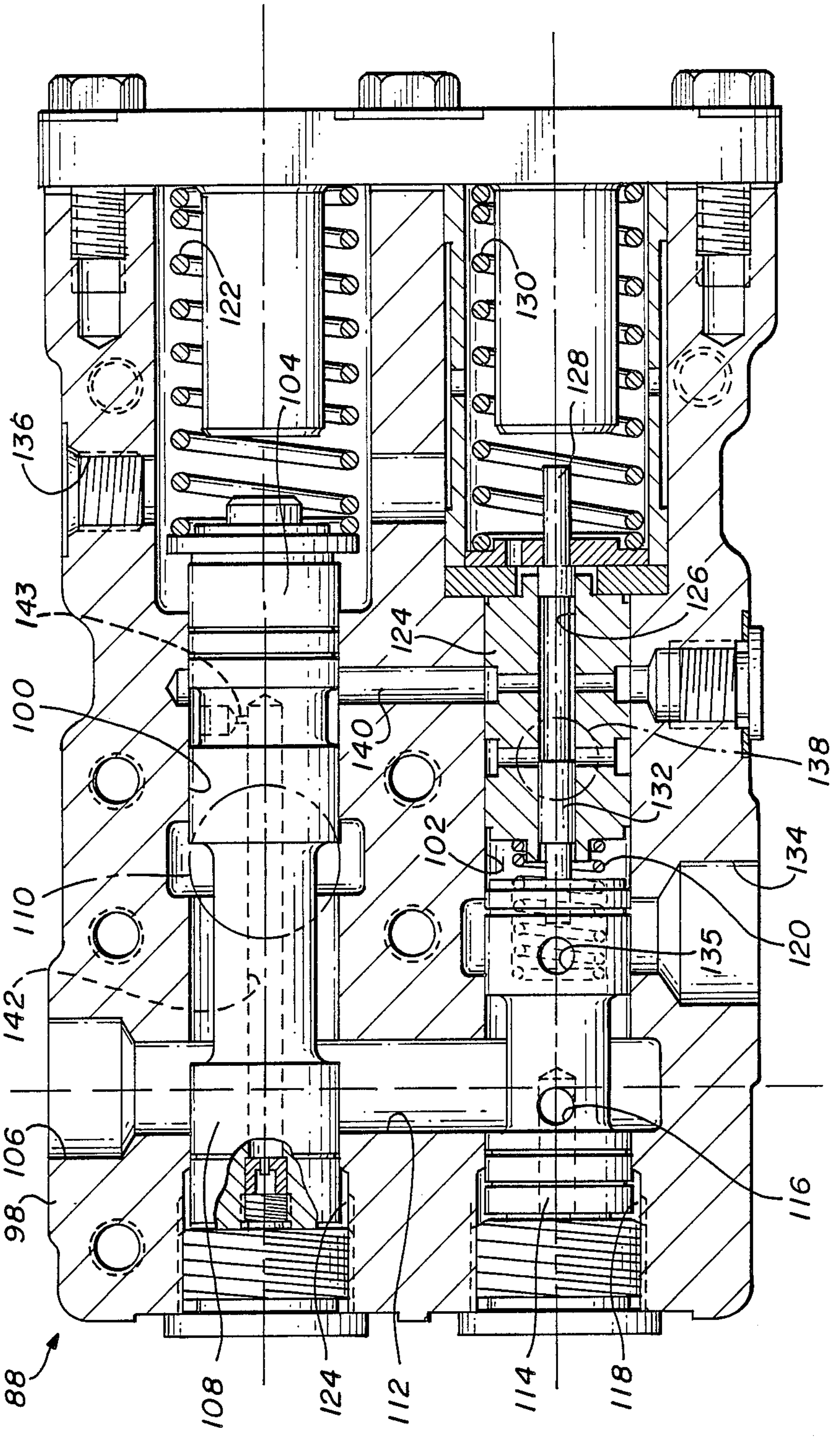
FIG. 2 is a greatly enlarged cross-sectional view of an unloader valve that is utilized in the operating system and that is also constructed in accordance with the invention.
Figure 4:
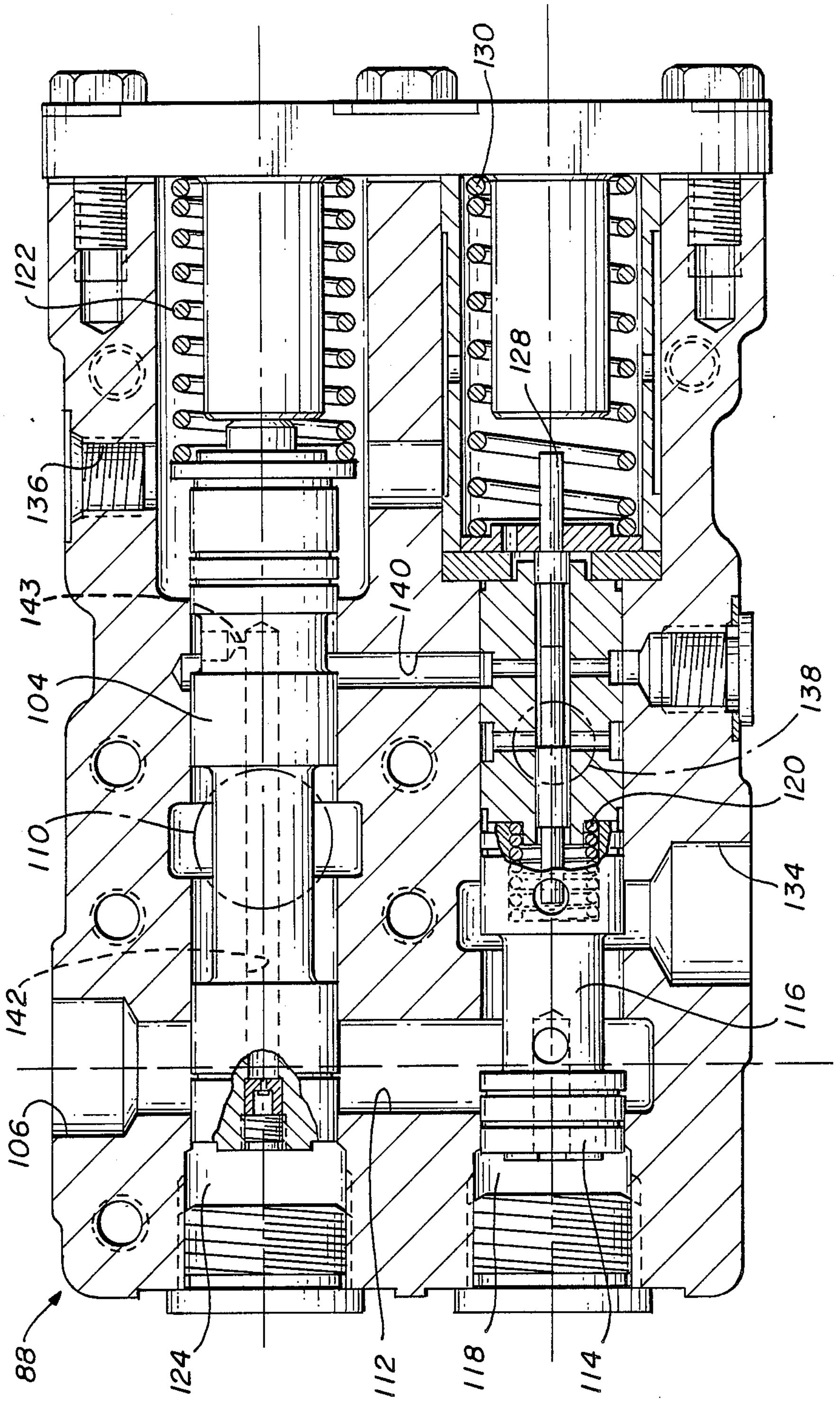
FIG. 4 is a view similar to FIG. 2 but illustrating the unloader valve of FIG. 2 in a different operating position.
Figure 5:
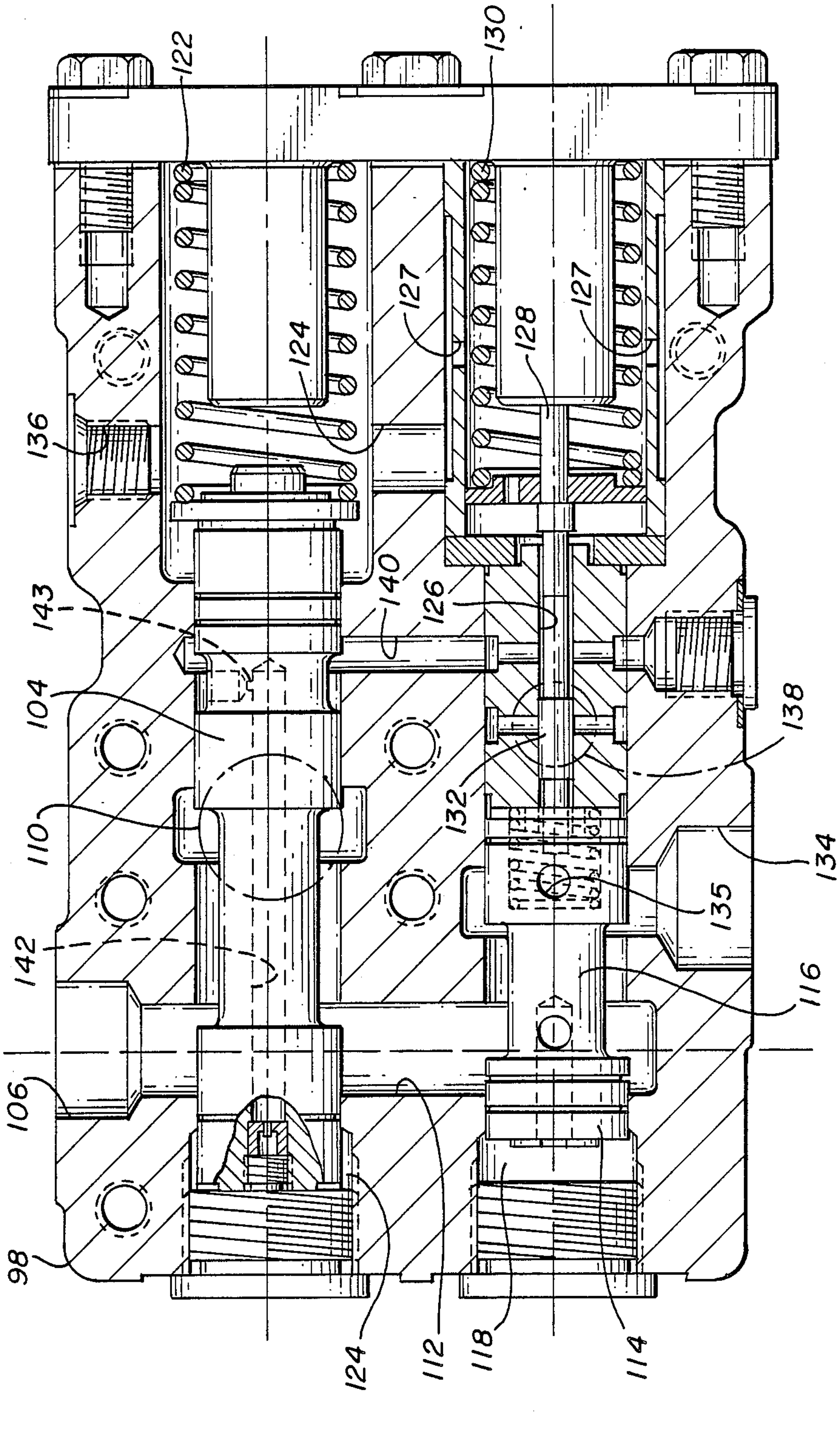
FIG. 5 is a view similar to FIG. 2 but illustrating the unloader valve of FIG. 2 in still another operating position.

The unloading valve means 88, which will be described more completely in connection with the description of FIGS. 2, 4 and 5, is connected by conduit 92 to the auxiliary pump 18 and by conduit 94 to the conduit 30 leading to the loader valve means 32. Conduit 96 connects the unloading valve means 88 to the reservoir 22.

Although not illustrated, it will be understood that the boom cylinders 50 and 52 are connected to the front end loader boom in such a manner that it will raise and lower the boom and the bucket attached thereto. Similarly, the bucket cylinder 58 is connected to the bucket in such a manner as to provide pivotal movement of the bucket in the front end loader boom from a roll back to a dump position.

Referring to FIG. 2 of the drawing, unloading means 88 is illustrated in substantially more detail. The unloading valve means 88 includes a housing 98 having parallel bores 100 and 102 extending therethrough. A first valve member 104 is located in the bore 100 and is movable therein.

Conduit 92 is connected to the housing 98 at the inlet port 106 and fluid flowing therethrough moves past a land 108 on the valve member 104 flowing outwardly through a port 110 which is connected to the conduit 96 returning the hydraulic fluid to the reservoir 22. The hydraulic fluid may also flow through lateral passageway 112 into the bore 102 and through an internal passageway 114 in a second valve member 116 located in the bore 102 into a chamber 118.

The valve member 116 is moveable in the bore 102. A spring 120 resiliently biases the second valve member 116 relatively to the left as seen in FIG. 2 and prevents movement of the valve member 116 to the right until the force developed by the fluid in the chamber 118 is sufficient to overcome the force of the spring 120.

Similarly, a spring 122 located in the bore 100 continually and resiliently urges the first valve member 104 to the left preventing movement of the valve member 104 until pressure in chamber 124 developes sufficient force to move the first valve member 104 to the right and against the spring 122.

Bore 102 also contains a spacer 124 having a bore 126 extending therethrough. A third valve member 128 is moveably located in the bore 126. The valve member 128 is resiliently biased by a spring 130 toward the left and has a land 132 thereon that is exposed to pressure in an outlet port 134 in the housing 98 through port 135 in the second valve member 116 during operation of the unloader valve means 88.

The outlet port 134 receives the conduit 94 which connects with the conduit 30 as previously described. A port 136 in the housing 98 is arranged to receive the conduit 96 which leads from the unloader valve means 88 to the reservoir 22. A pilot port 138 in the housing 98 connects the bore 126 in the spacer member 124 with conduit 86 which leads to the pressure sensing means 84.

Fluid entering the pilot port 138 flows past the reduced size portion of the valve member 128 into a cross passageway 140 in the housing 98 into the bore 100 and then through an internal passageway 142 through the valve 104 into the chamber 124. Rate of flow through the passageway 140 and into the passageway 142 is controlled by an orifice 143. Force in the chamber 124 results from the pressure signal from the pressure sensing device 84.

Figure 3:
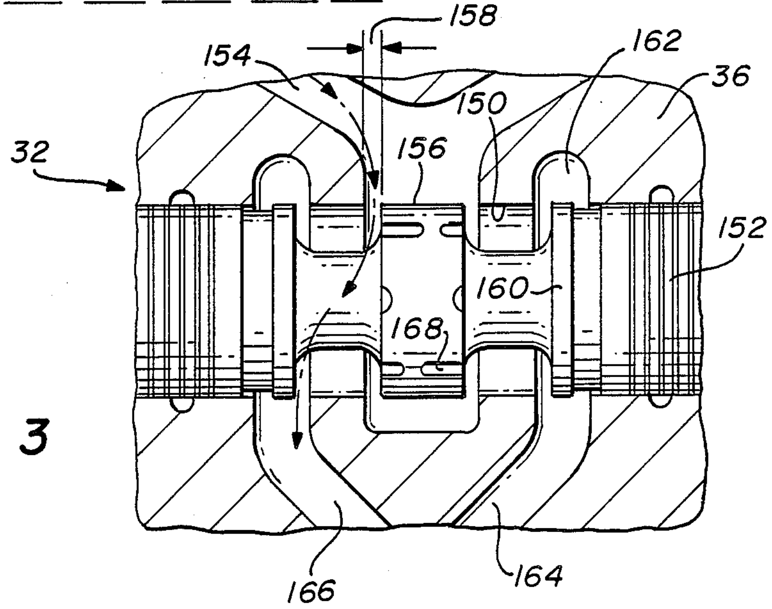
FIG. 3 is an enlarged fragmentary cross-sectional view of a portion of a loader valve that is also constructed in accordance with the invention and that is utilized in a control system.

Referring to FIG. 3, a fragmentary portion of the loader valve means 32 is illustrated. The valve housing 36 includes a bore 150 having a valve spool 152 movably located therein. It will be understood, although not shown, that one of the valve spools 150 is provided for the boom cylinder control and one for the bucket cylinder control.

The valve spool 152 extends across an internal flow passageway 154 in the housing 36. The flow passageway 154 is centrally located in the housing 36 and extends from the inlet 38 to the return outlet 40. More specifically, a flange 156 on the spool 152 is positioned in the flow passageway 154. As illustrated, the valve spool 152 is in a neutral position, that is, it is in a position wherein fluid will not be directed through any of the ports 42, 44, 54 or 56.

The valve spool 152 is movable in both directions in the bore 150 from the neutral position. To initiate flow through the ports just mentioned, the flange 156 is moved by pressure from one of the pilot valves 68 and 78 across the distance 158 shown in FIG. 3. When this distance is traversed, a land 160 on the spool 152 moves out of a cavity 162 into sealing engagement with the housing 36 in the bore 150 preventing fluid flow through a portion of the passageway 154 identified by the reference character 164. Flow is also essentially blocked through a portion of the passageway identified by the reference character 166 as the flange 156 approaches the housing 36.

It will be noted that a plurality of recesses and milled grooves 168 of various configuration are provided in the flange 156 which permit the control flow of fluid through the passageway 154 to the passageway portion 166, even though the flange 156 has moved into the bore 150. Reduction of the space 158 is highly desirable in that the less distance that the control valve spool 152 has to move, the quicker the response between the time that the pilot valves 68 and 78 are actuated and the cylinders 50, 52 and 58 respond. However, it is also important to maintain as low a resistance to flow as possible through the passageway 154 when the valve spools are in a neutral position to provide the maximum tractive power for the vehicle. It should be remembered that all the fluid to actuate the cylinders 50, 52 and 58 must pass through the passageway 154 and accordingly, it is desirable to reduce the power loss as much as possible of such fluid flowing under pressure therethrough.

OPERATION OF THE PREFERRED EMBODIMENT

With the front end loader started, but not operating the bucket or the boom, hydraulic fluid is pumped by the primary oump 16 through the conduit 30 into the loader valve eans 32 and straight through the passageway 154 therein to the conduit 34 and subsequently returning to the reservoir 22. With the pilot valves 68 and 78 in a neutral position, the pressure in the conduits 70, 72, 80 and 82 leading to the loader valve means 2 are below a predetermined valve, for example, about 170 psi.

When the pilot pressure is below this value, the unloader valve means 88 is in the position illustrated in FIG. 2 That is, the first valve member 104 will be in the lefmost position as retained therein by the spring 22. Also, the second valve member 116 will be in its leftmost position since the pressure in the chamber 118 is insufficient to overcome the force of the sprino 120. Consequently, flow from the auxiliary pump 18 through the conduit 92 into the unloader valve means 8 circulates from the inlet port 106 through the bore 100 and outwardly through the port 110 into the conduit 9 to return to the reservoir 22. As mentioned previously, no fluid can flow outwardly through the outlet port 134 due to the leftward position of the valve member 116. The only fluid flow reaching the loader valve means 32 is that volume developed by the primary pump 16. Accordingly, the spaces 158 between the flange 156 and the housing 36 of the loader valve means 32 can be substantially reduced as compared to a valve in which full flow of both pumps is flowing therethrough when the system is in neutral.

As one or both of the pilot valves 68 and 78 are stroked, that is, moved toward a position supplying additional force or power to the boom and bucket cylinders, pressure in the pilot system increases and the pressure sensing device 84 senses the highest of those pressures transmitting such pressure through the conduit 86 into the pilot port 138 of the unloader valve means 88. Such pressure is transmitted past the third valve member 128 through the transverse passageway 140 and into the internal passageway 142 of the valve member 104.

When the pressure in the pilot system increases above the predetermined value, which typically occurs at or about 75% of pilot valve stroke, the force developed by the pilot pressure in the chamber 124 urges the member 104 to the right against the force of the spring 122. Such movement causes the valve member 104 to close the port 110 preventing return fluid flow to the reservoir 22 through the conduit 96. The increse in pressure also causes the pressure to increase is the chamber 118, moving the second valve member 11 to the right against the force of the spring 120 as illustrated in FIG. 4.

Movement of the valve member 116 to the right opens the outlet port 134 to the transverse passageway 112 and flow from the auxiliary pump 18 then flows through the unloading valve means 88 into the conduit 94 joining the flow from the primary pump 16 in the conduit 30 which leads to the loader valve means 32. Thus, when the pressure increases and additional fluid volume is needed to rapidly move either the bucket cylinder 58 or the boom cylinders 50 and 52, that volume is available beause both the primary pump 16 and the auxiliary pump 18 are supplying fluid into the loader valve means 32.

At times, a large amount of force, and consequently, pressure is needed to actuate the cylinders. This pressre is reflected as increased pessure in the outlet port 134 of the unloader valve means 88 as the load icreases in the bucket. When this occurs, the pressre increases in the conduit 94 and when such pressure reaches a second predetermined value, usually slightly below the main relief valve setting, which may be about 2800 psi, for example, adequate force is developed on the land 132 to move the third valve member 128 to the right, compressing the spring 130 as illustrated in FIG. 5.

The movement opens the bore 126 to the reservoir 22 through lateral passageways 127 and 129 and through the port 136 which connects to the conduit 96 and dumps the pilot pressure to the reservoir 22. As a consequence, the transverse port 140, internal passageway 142 in the valve member 104 and the chamber 124 are also vented t the reservoir 22. When this occurs, the spring 12 drives the first valve member 104 to its initial position to the left as illustrated in FIG. 5 and again opens the flow from the auxiliary pump 18 to the reservoir 22 through the outlet port 110 in the housing 98. Since the rate of flow through the passageway 140 to and from the passageway 142 is controlled by the orifice 143, the shifting of the valve member 104 is softened and the pump 19 is placed in and out of service less abruptly.

Although not llustrated, the second valve member 116 is also reurned to its leftmost position since the chamber 118 is also vented to the reservoir 22 through the internal passageway 114 and the lateral passageway 112 in the housing 98.

As a result of the bypassing or recirculation of the auxiliary pump fluid to the reservoir, the volume flowing through the loader valve means 32 is substantially reduced. Also, such bypassing of the fluid reduces the power requirement of the auxiliary pump 18 permitting the power that would otherwise be consumed thereby to be utilized as tractive effort in the front end unloader.

It should also be pointed out that with the reduced flow through the passageway 154 of the loader valve means 32, very slight manipulations of the pilot valves 68 and 78 cause the valve spools 152 to move and provide very fine fluid flow control through the milled recesses 168 formed in the flange 156 of the spool 152. Accordingly, not only is additional tractive effort available to the operator of the loader, but a much more sensitive control of the boom and bucket is available when heavy lads are exerted thereon.

Having descrioed but a single embodiment of the invention, it will be understood that many variations and modifications can be made thereto without departing fromthe spirit or the scope of the invention.

What is claimed is:

1. A control system for a front end loader boom and bucket operating system including primary and auxiliary pumps comprising:

a fluid reservoir arranged to be connected to said pumps;

a pilot pump connected to said reservoir for providing pressurized hydraulic fluid to the contol system;

at least one pilot valve connected to said pilot pump; and unloader valve means connected to said pilot valve and reservoir and responsive to pressure of first and second predeterined values for directing fluid from said auxiliary pump to said reservoir when said pressure is below said first predetermined value and when said pressure is above said second predetermined value, thereby providing additional tractive power to the loader since the auxiliary pump is unloaded.

2. A hydraulc boom and bucket operating system for front end loaders and the like including a control system for the operating system, said systems comprising:

a fluid reservoir;

a primary and an auxiliary pump connected to said reservoir for delivering pressurized hydraulic fluid into said boom and bucket operating system;

pilot actuated loader valve means connected to said primary pump and arranged to be connected to cylinders powering the boom and bucket for controlling flow from said pumps to said cylinders;

a pilot pump connected to said reservoir for providing pressurized hydraulic fluid into said control system;

first and second pilot valves connected to said pilot pump and to said loader valve means for controlling said loader valve means;

means for seeing the highest pressure in the control system between said pilot valves and loader valve means; and, a pilot actuated unloader valve connecting said auxiliary pump to said loader valve means when said highest pressure is above a first predetermined value and when the pressure in said primary pump is below a second higher predetermined value thereby increasing the volume of fluid flowing into said loader valve means.

3. The system of claim 2 and also including driving means connected to said pumps and arranged to propel the front end lader, said system providing additional tractive power when said auxiliary pump is connected to direct fluid to said reservoir.

4. The system of claim 2 wherein said loader valve means includes:

a loader valve housing having a flow passageway therethrough with an inlet connected to said primary pump and unloader valve and having a return outlet connected to said reservoir, said housing having at least first and second outlets connected with said inlet and with one of the boom and bucket;

first and second spaced annular valve seats in said housing encircling said flow passageway;

at least one valve spool moveable in said housing from a neutral position wherein said inlet is connected with said return outlet, to a first position connecting said inlet and first outlet, and to a second position connecting said inlet and second outlet, said spool having an annular flange portion located in said flow pasageway between said seats when in the neutral position, said flange portion having at least one flow control recess formed in a periphery thereof permitting reduced flow through said passageway when said spool is moved toward said first and second positions; and first and second spaces between said flange portion and annular valve seats when said spool is in the neutral position sized to maintain fluid pressure caused by flow therethrough below said first predetermined pressure, thereby reducing the movement distance of said valve spool from said neutral to said first and second positions and reducing the lag time beteen movement of said pilot valves and the reaction of said boom and bucket.

5. In an improved pilot control system for a hydraulic boom and bucket operating system for front end loaders and the like that include a primary pump, an auxiliary pump, a plot pump, and a loader valve means, the improvement comprising a pilot-actuated unloading valve including:

a valve housing arranged to be connected to the auxiliary pump, to a hydraulic fluid reservoir, to a loader valve means for controllng fluid flow to the boom and bucket, and connected to pilot valve means;

a first valve member having first and second ends moveable in said housing between a first position directing flow from said auxiliary pump to said reservoir and a second position directing the flow to the loader valve means;

a second valve member having first and second ends movable in said housing between a first position preventing flow to the loader valve means from said first valve member and a second position permitting such flow; and, a third valve member having first and second ends moveable in said housing between a first position directing flow from said pilot valve means against the first end of said first valve member for moving said first valve member from its first to its second position and a second position directing such flow to said reservoir to release the pressure on the first end of said first valve member whereby said first valve member returns to its said first position directing flow from said auxiliary pump to said reservoir.

6. In an improved pilot control system for a hydraulic boom and bucket operating system for front end loaders and the like that includes a primary pump, an auxiliary pump, pilt pump, and a loader valve means, the improvement comprising a pilot-actuated unloading valve including:

a valve housing arranged to be connected to the auxiliary pump, to a hydraulic fluid reservoir, to loader valve means for controlling fluid flow to the boom and bucket, and to pilot valve means;

a first valve member having first and second ends movable in said housing between a first position directing flow from said auxiliary pump to said reservoir and a second position directing the flow to the loader valve means;

a second valve member having first and second ends movable in said housing between a first position preventing flow to the loader valve means and a second position permitting such flow;

a third valve member having first and second ends movable in said housing between a first position directing flow from said pilot valve means against the first end of said first valve member and a second position directing such flow to said reservoir;

first resilient means engaging the second end of said first valve member for exerting a force thereon whereby when the pilot fluid pressure on said first end is above a predetermined value when said first valve member moves to said second position;

second resilient means engaging the second end of said second valve member urging said second valve member toward its said first position; and third resilient means engaging the second end of said third valve member for exerting a force thereon whereby when fluid pressure to the loader valve means on the first end of said third valve member exceeds a predetermined value higher than said first-mentioned predetermined value said third valve member moves to its said second position dumping the pilot fluid pressure to said reservoir permitting said first valve member to return to its first position connecting the auxiliary pump to the reservoir.

* * * * *